(12) United States Patent
Ding et al.

(10) Patent No.: US 11,157,781 B2
(45) Date of Patent: Oct. 26, 2021

(54) DEVICE AND METHOD FOR ASSESSING QUALITY OF VISUALIZATIONS OF MULTIDIMENSIONAL DATA

(71) Applicant: ROYAL BANK OF CANADA, Montreal (CA)

(72) Inventors: Weiguang Ding, Toronto (CA); Yik Chau Lui, Toronto (CA)

(73) Assignee: ROYAL BANK OF CANADA, Montreal (CA)

( * ) Notice: Subject to any disclaimer, the term of this patent is extended or adjusted under 35 U.S.C. 154(b) by 189 days.

(21) Appl. No.: 16/138,052

(22) Filed: Sep. 21, 2018

(65) Prior Publication Data

US 2019/0087692 A1    Mar. 21, 2019

Related U.S. Application Data

(60) Provisional application No. 62/561,416, filed on Sep. 21, 2017.

(51) Int. Cl.
*G06F 7/00* (2006.01)
*G06K 9/62* (2006.01)
*G06F 16/904* (2019.01)

(52) U.S. Cl.
CPC ......... *G06K 9/6276* (2013.01); *G06F 16/904* (2019.01); *G06K 9/6215* (2013.01); *G06K 9/6222* (2013.01); *G06K 9/6234* (2013.01)

(58) Field of Classification Search
CPC .. G06K 9/6276; G06K 9/6222; G06K 9/6234; G06K 9/6215; G06F 16/904;

(Continued)

(56) References Cited

U.S. PATENT DOCUMENTS 6,067,369 A * 5/2000 Kamei ............... G06K 9/4633
                                      382/125
6,690,371 B1 * 2/2004 Okerlund ............ G06T 11/008
                                      345/424

(Continued)

OTHER PUBLICATIONS

Arseniy Akopyan and Roman Karasev. A tight estimate for the waist of the ball. arXiv preprint arXiv:1608.06279, 2016.

(Continued)

*Primary Examiner* — Mohammed R Uddin
(74) *Attorney, Agent, or Firm* — Norton Rose Fulbright Canada LLP

(57) ABSTRACT

A system and method for determining a reliability score indicative of a level of fidelity between high dimensional (HD) data and corresponding dimension-reduced (LD) data are provided. The system comprises a processor, and a non-transitory computer-readable medium having stored thereon program instructions executable by the processor. The processor is configured to perform the method. The method comprises performing a dimension reduction on the HD data (the dimension reduction resulting in the corresponding LD data), normalizing the HD data and LD data, determine N nearest neighbors of each data point in the HD data and LD data (respectively), determining HD neighbors and correspondence LD neighbors for each data point, determining LD neighbors and correspondence HD neighbors for each data point, determining a distance between the LD neighbors and correspondence LD neighbors, determining a distance between the HD neighbors and correspondence HD neighbors, determining a cost for the dimension reduction, and determining that the cost is within a fidelity range.

13 Claims, 11 Drawing Sheets

(58) Field of Classification Search
CPC ............. G06F 17/30994; G06F 17/153; G06F 16/2264; G06F 17/175
See application file for complete search history.

(56) References Cited

U.S. PATENT DOCUMENTS

| | | | | |
|---|---|---|---|---|
| 8,693,788 | B2* | 4/2014 | Wojton | G16H 30/40 382/209 |
| 10,607,121 | B2* | 3/2020 | Takimoto | G06K 9/6254 |
| 2005/0084136 | A1* | 4/2005 | Xie | G06F 16/9577 382/107 |
| 2007/0058865 | A1* | 3/2007 | Li | G06K 9/6224 382/173 |
| 2010/0040281 | A1* | 2/2010 | Chen | G06N 3/0454 382/156 |
| 2010/0098306 | A1* | 4/2010 | Madabhushi | G06T 7/0012 382/128 |
| 2010/0223276 | A1* | 9/2010 | Al-Shameri | G06K 9/0063 707/769 |
| 2011/0054869 | A1* | 3/2011 | Li | G06F 30/20 703/10 |
| 2013/0088517 | A1* | 4/2013 | McKenna | G06F 16/904 345/635 |
| 2013/0202177 | A1* | 8/2013 | Bar-Aviv | G06T 11/008 382/131 |
| 2013/0273968 | A1* | 10/2013 | Rhoads | H04W 4/50 455/556.1 |
| 2014/0079297 | A1* | 3/2014 | Tadayon | G06K 9/00288 382/118 |
| 2015/0147728 | A1* | 5/2015 | Hochenbaum | G09B 5/06 434/118 |
| 2015/0153476 | A1* | 6/2015 | Prange | G06F 17/10 703/2 |
| 2015/0293884 | A1* | 10/2015 | Cuturi Cameto | G06F 17/18 708/201 |
| 2016/0124903 | A1* | 5/2016 | Agee | H03H 21/0012 708/322 |
| 2016/0242690 | A1* | 8/2016 | Principe | A61B 5/04012 |
| 2017/0004573 | A1* | 1/2017 | Hussain | H04L 63/08 |
| 2017/0083608 | A1* | 3/2017 | Ye | G06N 20/00 |

OTHER PUBLICATIONS

Laurent Amsaleg, Oussama Chelly, Teddy Furon, Stéphane Girard, Michael E Houle, Ken-ichi Kawarabayashi, and Michael Nett. Estimating local intrinsic dimensionality. In Proceedings of the 21th ACM SIGKDD International Conference on Knowledge Discovery and Data Mining, pp. 29-38. ACM, 2015.
Michaël Aupetit. Visualizing distortions and recovering topology in continuous projection techniques. Neurocomputing, 70(7):1304-1330, 2007.
Kevin Bache and Moshe Lichman (website administrators). Uci machine learning repository. https://archive.ics.uci.edu/ml/index.php, 2013.
Mikhail Belkin and Partha Niyogi. Laplacian eigenmaps and spectral techniques for embedding and clustering. In NIPS, vol. 14, pp. 585-591, 2001.
Nicolas Bonneel, Michiel Van De Panne, Sylvain Paris, and Wolfgang Heidrich. Displacement interpolation using agrangian mass transport. In ACM Transactions on Graphics (TOG), vol. 30, p. 158. ACM, 2011.
Ingwer Borg and Patrick JF Groenen. Modem multidimensional scaling: Theory and applications. Springer Science & Business Media, 2005.
Jean Bourgain. On lipschitz embedding of finite metric spaces in hilbert space. Israel Journal of Mathematics, 52 (1):46-52, 1985.
Jean Bourgain, Sjoerd Dirksen, and Jelani Nelson. Toward a unified theory of sparse dimensionality reduction in euclidean space. Geometric and Functional Analysis, 25(4):1009-1088, 2015.
Christos Boutsidis, Anastasios Zouzias, and Petros Drineas. Random projections for k-means clustering. In Advances in Neural Information Processing Systems, pp. 298-306, 2010.
Neal L Carothers. Real analysis. Cambridge University Press, 2000, Chapter 9, https://archive.org/details/CarothersN.L.RealAnalysisCambridge2000Isbn0521497566416S_201703/mode/2up.
Sanjoy Dasgupta and Anupam Gupta. An elementary proof of a theorem of Johnson and lindenstrauss. Random Structures & Algorithms, 22(1):60-65, 2003.
Pierre Demartines and Jeanny Hérault. Curvilinear component analysis: A self-organizing neural network for nonlinear mapping of data sets. IEEE Transactions on neural networks, 8(1):148-154, 1997.
Daniele Granata and Vincenzo Carnevale. Accurate estimation of the intrinsic dimension using graph distances: Unraveling the geometric complexity of datasets. Scientific Reports, 6, 2016.
Arthur Gretton, Karsten M Borgwardt, Malte J Rasch, Bernhard Schölkopf, and Alexander Smola. A kernel two-sample test. Journal of Machine Learning Research, (Mar. 13):723-773, 2012.
Larry Guth. The waist inequality in gromov's work. The Abel Prize 2008, pp. 181-195, 2012.
Geoffrey Hinton and Sam Roweis. Stochastic neighbor embedding. In NIPS, vol. 15, pp. 833-840, 2002.
Gisli Hjaltason and Hanan Samet. Contractive embedding methods for similarity searching in metric spaces. 2000.
Heather Johnston. Transversality for homology manifolds. Topology, 38(3):673-697, 1999.
Samuel Kaski, Janne Nikkila, Merja Oja, Jarkko Venna, Petri Törönen, and Eero Castrén. Trustworthiness and metrics in visualizing similarity of gene expression. BMC bioinformatics, 4(1):48, 2003.
Balázs Kégl. Intrinsic dimension estimation using packing numbers. In Advances in neural information processing systems, pp. 697-704, 2003.
Bo'az Klartag. Convex geometry and waist inequalities. arXiv preprint arXiv:1608.04121, 2016.
Peter S Landweber, Emanuel A Lazar, and Neel Patel. On fiber diameters of continuous maps. American Mathematical Monthly, 123(4):392-397, 2016.
Yann LeCun, Léon Bottou, Yoshua Bengio, and Patrick Haffner. Gradient-based learning applied to document recognition. Proceedings of the IEEE, 86(11):2278-2324, 1998.
Sylvain Lespinats and Michaël Aupetit. Checkviz: Sanity check and topological clues for linear and non-linear mappings. In Computer Graphics Forum, vol. 30, pp. 113-125. Wiley Online Library, 2011.
Elizaveta Levina and Peter J Bickel. Maximum likelihood estimation of intrinsic dimension. In Advances in neural Information processing systems, pp. 777-784, 2005.
Laurens van der Maaten and Geoffrey Hinton. Visualizing data using t-sne. Journal of Machine Learning Research, (Nov. 9):2579-2605, 2008.
Rafael Messias Martins, Danilo Barbosa Coimbra, Rosane Minghim, and Alexandru C Telea. Visual analysis of dimensionality reduction quality for parameterized projections. Computers & Graphics, 41:26-42, 2014.
Robert J McCann and Nestor Guillen. Five lectures on optimal transportation: geometry, regularity and applications. Analysis and geometry of metric measure spaces: lecture notes of the séminaire de Mathématiques Supérieure (SMS) Montréal, pp. 145-180, 2011.
James McQueen, Marina Meila, and Dominique Joncas. Nearly isometric embedding by relaxation. In Advances in Neural Information Processing Systems, pp. 2631-2639, 2016.
Sergey A Melikhov and Evgenij V Shchepin. The telescope approach to embeddability of compacta. arXiv preprint math/0612085, 2006.
Michael Müger. A remark on the invariance of dimension. Mathematische Semesterberichte, 62(1):59-68, 2015.
Vinod Nair and Geoffrey E Hinton. Rectified linear units improve restricted boltzmann machines. In Proceedings of the 27th international conference on machine learning (ICML-10), pp. 807-814, 2010.
M Gromov. Isoperimetry of waists and concentration of maps_ Geometric & Functional Analysis GAFA, 13(1):178-215, 2003.

(56) References Cited

OTHER PUBLICATIONS

Malte Roeer. On the finite dimensional approximation of the kuratowski-embedding for compact manifolds. arXiv preprint arXiv:1305.1529, 2013.

Sam T Roweis and Lawrence K Saul. Nonlinear dimensionality reduction by locally linear embedding. science, 290 (5500)2323-2326, 2000.

John W Sammon. A nonlinear mapping for data structure analysis. IEEE Transactions on computers, 100(5):401-409, 1969.

Bernhard Schölkopf, Alexander Smola, and Klaus-Robert Müller. Kernel principal component analysis. In International Conference on Artificial Neural Networks, pp. 583-588. Springer, 1997.

Tobias Schreck, Tatiana Von Landesberger, and Sebastian Bremm. Techniques for precision based visual analysis of projected data. Information Visualization, 9(3):181-193, 2010.

Joshua B Tenenbaum, Vin De Silva, and John C Langford. A global geometric framework for nonlinear dimensionality reduction. science, 290(5500):2319-2323, 2000.

Jarkko Venna, Jaakko Peltonen, Kristian Nybo, Helena Aidos, and Samuel Kaski. Information retrieval perspective to nonlinear dimensionality reduction for data visualization. Journal of Machine Learning Research, (Feb. 11):451-490, 2010.

Nakul Verma. Distance preserving embeddings for general n-dimensional manifolds. Journal of Machine Learning Research, 14(1):2415-2448, 2013.

Cédric Villani. Optimal transport: old and new, vol. 338. Springer Science & Business Media, 2008.

\* cited by examiner

Receiving, by a processor, a high dimensional data set and at least one low dimensional visualization thereof;
902

Normalizing by average pairwise distance, both the high dimensional data set and the at least one low dimensional data visualization;
904

Determining the nearest neighbors for each data point for both the high dimensional data set and the at least one low dimensional visualization;
906

Identifying each data point's neighbors in the high dimensionality data set {a'_i} and their low dimensional data visualization correspondents {a_i};
908

Identifying each data point's neighbors in the low dimensional data visualization {b'_i} and their high dimensional data set correspondents {b_i}
910

Determine: distance between {b'_i} and {a_i} as Wasserstein discontinuity; Wasserstein distance between {a'_i} and {b_i} as Wasserstein many-to-one; and average Wasserstein distance between Wasserstein distance discontinuity and many-to-one as an average cost
912

Transmitting quality measures, as well as one or more low dimensionality visualizations producing quality measures above a pre-set threshold to an output
914

Storing the quality measures, and at least one identifier of the high dimensional data set in a memory to optimize future performance.
914

FIG. 9

DEVICE AND METHOD FOR ASSESSING QUALITY OF VISUALIZATIONS OF MULTIDIMENSIONAL DATA

CROSS-REFERENCE TO RELATED APPLICATIONS

This application claims all benefit including priority to U.S. Provisional Patent Application 62/561,416, filed Sep. 21, 2017, and entitled: "Device and Method for Visualization of Multidimensional Data," which is hereby incorporated by reference in its entirety.

FIELD

Some embodiments described herein relate to computer implemented methods for data visualization and, more particularly, to a system and method to determine fidelity of visualizations of multi-dimensional data sets.

INTRODUCTION

Dimensionality reduction can be used in various fields, including machine learning, data mining, and data visualization. Empirical measures have been designed for characterizing the imperfection of dimensionality reduction mappings (e.g., principal component analysis (PCA), linear discriminant analysis, generalized discriminant analysis).

From a quantitative topology point of view, a challenge can be characterized as an incompatibility of continuity and one-to-one when reducing dimensions. Specifically, continuity and one-to-one are closely related to known dimensionality reduction quality measures. For example, continuous versions of precision and recall cannot both be perfect in an arbitrary region for any dimensionality reduction maps. Furthermore, there is a nontrivial upper bound on the sum of precision and recall for continuous dimensionality reduction maps.

SUMMARY

When visualizing high dimensional data in 2-D (e.g., alternatively 4-D, or 3-D or 1-D), that the relationship between visualized neighbours is important. The visualization can be considered to be reliable if neighbours in high dimension and low dimension visualizations are the same.

In accordance with an embodiment, there is provided a system for determining a reliability score indicative of a level of fidelity between high dimensional (HD) data and corresponding dimension-reduced (LD) data. The system comprises a processor, and a non-transitory computer-readable medium having stored thereon program instructions executable by the processor. The processor is configured to perform a dimension reduction on the HD data (the dimension reduction resulting in the corresponding LD data), normalize the HD data and LD data, determine N nearest neighbors of each data point in the HD data and LD data (respectively), determine HD neighbors and correspondence LD neighbors for each data point, determine LD neighbors and correspondence HD neighbors for each data point, determine a distance between the LD neighbors and correspondence LD neighbors, determine a distance between the HD neighbors and correspondence HD neighbors, determine a cost for the dimension reduction, and determine that the cost is within a fidelity range.

In accordance with another embodiment, there is provided a computer-implemented method of determining a reliability score indicative of a level of fidelity between high dimensional (HD) data and corresponding dimension-reduced (LD) data. The method comprises performing a dimension reduction on the HD data, the dimension reduction resulting in the corresponding LD data, normalizing the HD data and LD data, determining N nearest neighbors of each data point in the HD data and LD data (respectively), determining HD neighbors and correspondence LD neighbors for each data point, determining LD neighbors and correspondence HD neighbors for each data point, determining a distance between the LD neighbors and correspondence LD neighbors, determining a distance between the HD neighbors and correspondence HD neighbors, determining a cost for the dimension reduction, and determining that the cost is within a fidelity range.

In accordance with another embodiment, there is provided a non-transitory computer-readable storage medium having instructions thereon which when executed by a processor perform a method of determining a reliability score indicative of a level of fidelity between high dimensional (HD) data and corresponding dimension-reduced (LD) data. The method comprises performing a dimension reduction on the HD data, the dimension reduction resulting in the corresponding LD data, normalizing the HD data and LD data, determining N nearest neighbors of each data point in the HD data and LD data (respectively), determining HD neighbors and correspondence LD neighbors for each data point, determining LD neighbors and correspondence HD neighbors for each data point, determining a distance between the LD neighbors and correspondence LD neighbors, determining a distance between the HD neighbors and correspondence HD neighbors, determining a cost for the dimension reduction, and determining that the cost is within a fidelity range.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in this description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIG. 7 and FIG. 9 are process diagrams depicting example methods for measuring a level of fidelity between a target dimensionality reduction (DR) data visualization map and underlying high dimensional data;

DETAILED DESCRIPTION

Figure 1:
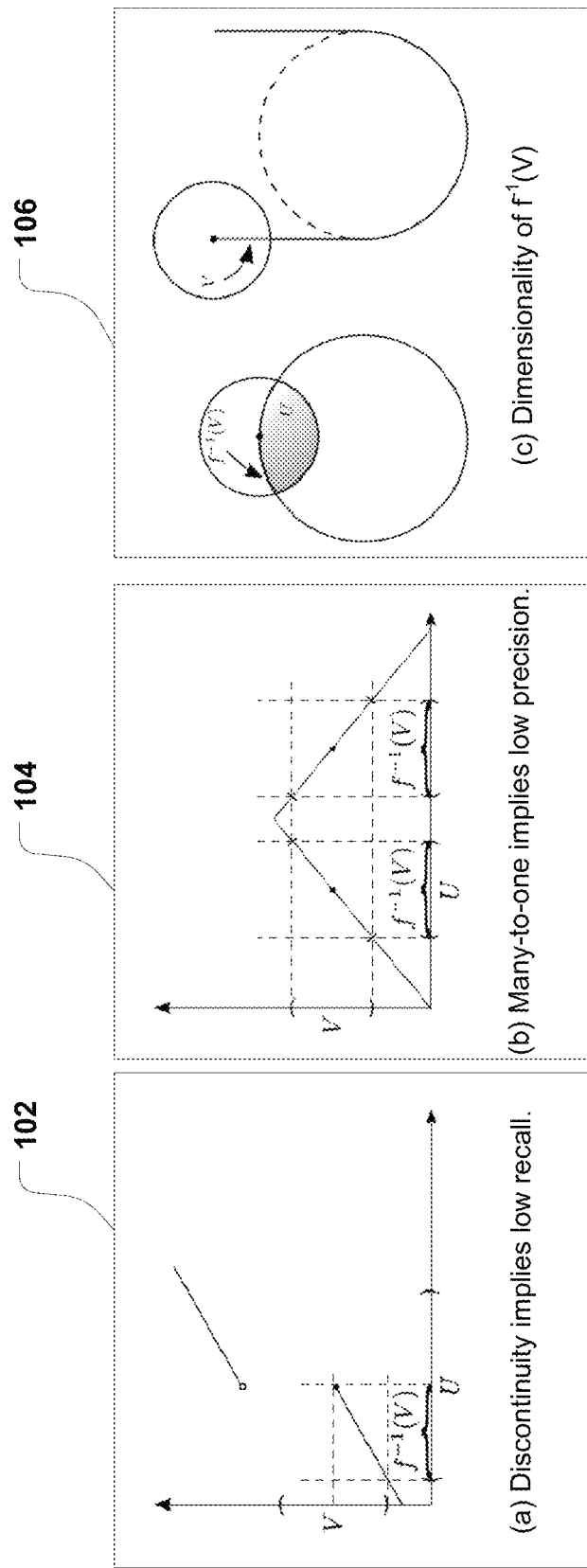
FIG. 1A is an example illustration depicting how the concepts of discontinuity and low recall relate.
FIG. 1B is an example illustration depicting how the concepts of many-to-one and low precision relate.
FIG. 1C is an example illustration showing features of the concept of dimensionality according to some embodiments.

Embodiments of methods, systems, and apparatus are described through reference to the drawings.

This discussion provides many example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed. The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

High dimensional data is often subjected to dimensionality reduction processes in order to produce a transformation of the original high dimensional data set in a reduced number of dimensions. When visualizing high dimensional data in two dimensions (2-D) (e.g., alternatively 4-D, or 3-D or 1-D), the relationship between visualized neighbours can be used to test the reliability of the dimension reduction algorithm used to reduce the dimensions. The visualization can be considered to be reliable if neighbours in high dimension and low dimension visualizations are the same. A computer-implemented tool configured to evaluate different visualization setups is useful. The tool can be configured to determine the quality/reliability of the visualization by determining whether neighbours have changed between the visualizations of different dimensionality, and the tool can be configured to determine how much, if any the distance distribution between the neighbours has changed. Lower dimensional data sets, for example, derived as a visualization map of higher dimensional data may be lossy as a result of transformation, and the tool may help to identify whether the visualization map is sufficiently reliable for a particular purpose.

Approaches, in some embodiments, are not data-set specific and can be applied to various types of high dimensionality data. The tool may be implemented using automated, computer implemented approaches operable on processors, non-transitory memory, interface devices, among others. For example, a configured computer server or implementation on sets of distributed computing resources are possible, and in some embodiments, a special purpose device (e.g., a specialized rack-mounted device/appliance that is configured for a limited set of uses, such as a dedicated, single use device) is provided that is specifically configured and/or optimized for performing the steps of methods of various embodiments described herein.

The visualization maps, for example, include a lower dimensionality reduction data visualization map that is generated from the underlying high dimensional data (in other embodiments, a higher dimensionality reduction data visualization map can also be generated). A comparison may be conducted to determine whether changes have occurred between corresponding visualized data elements of the target dimensionality reduction data visualization map.

Upon a determination that changes have occurred, for each change, the method includes determining a level of change between the corresponding visualized data elements of the target dimensionality reduction data visualization map and the lower dimensionality reduction data visualization map.

The level of change can be identified based on a distance distribution generated between each corresponding visualized data element and at least one of the higher dimensionality reduction data visualization map and the lower dimensionality reduction data visualization map.

A reliability score can be generated based upon an aggregate of the level of change for each of the one or more changes, the reliability score reflective of a level of data integrity between the target dimensionality reduction data visualization map and the underlying high dimensional data where data is lost during a data reduction transformation.

In accordance with another aspect, each distance distribution is a Wasserstein distance adapted for quantifying continuity and one-to-one correspondence between the corresponding visualized data elements.

In accordance with another aspect, each Wasserstein distance is normalized by an average pairwise distance, and wherein discrete precision and recall is generated for each distance distribution.

In accordance with another aspect, the method further comprises processing each Wasserstein distance to measure discontinuity and many-to-one relationships.

In accordance with another aspect, the target dimensionality reduction data visualization map is a continuous dimensionality reduction data visualization map.

The tool has practical implementation approaches in a variety of fields, for example, in relation to assessing search engine performance (e.g., in relation to precision and recall for text search, image searches, among other), evaluation of data visualization quality on dimension reduction algorithms such as principal component analysis (PCA), T-distributed Stochastic Neighbor Embedding (t-SNE), diffusion maps, etc.

Further, the tool can be utilized to evaluate quality of dimensionality reduction performed on databases, for example, where there is a desire to save storage space, without sacrificing too much on another objective.

Computer implemented methods for evaluating various features indicating the fidelity of dimensionality reduction data visualization maps produced by different dimensionality reduction processes are described in various embodiments. Quality/fidelity may be scored by determining whether the neighbours have changed between the dimensionality-reduced visualizations and the underlying data set, and quantifying any such change by one or more factors. The methods of some embodiments described herein is not data-set specific and can be applied to many sets of data having high dimensionality. For example, different data sets may be considered, such as customer data (e.g., in the context of a financial institution), fraud data, trading activity data, among others.

Visualization provides a useful tool that can be utilized for pattern recognition, representing elements of information and/or relationships based on raw or transformed data in various visual interface models that are rendered on a graphical user interface. The visualizations can receive high dimensionality data (e.g., vectors having 4+ dimensions), and transform the high dimensionality data into representations that are more readily analyzed through pattern recognition by humans or automated mechanisms. As humans are only able to perceive situations in one to three dimensions (or four dimensions if time is considered), in some cases, there must necessarily be a reduction of dimensionality to generate visualizations that can be processed by a human operator.

The generation of visualizations from high dimensionality data can lead to technical challenges in relation to data integrity and fidelity. For instance, data integrity and fidelity may be lost during the transformation process from the high dimensionality data to visualizations of reduced dimensionality, and accordingly, where data integrity and fidelity is lost, spurious or incorrect patterns and/or trends may be identified, or conversely, patterns or trends that do exist are missed during analysis. Accordingly, dimensionality reduction is a fundamental problem in many areas, including machine learning, data mining, and data visualization. Many empirical measures have been designed for characterizing the imperfection of dimensionality reduction (DR) mappings (e.g., principal component analysis, linear discriminant analysis, generalized discriminant analysis). The impacts of lost data integrity and fidelity can be difficult to locate, and it is difficult to understand the impacts on a particular visualization. For example, a DR mapping may necessitate a loss of data, but the loss of data, in some instances, can be acceptable as it does not materially modify the visualization or the veracity of the visualization.

From a quantitative topology point of view, this fundamental problem can be characterized as an incompatibility of continuity and one-to-one when reducing dimensions. Specifically, continuity and one-to-one are closely related to known DR quality measures. For example, continuous versions of precision and recall cannot both be perfect in an arbitrary region for any DR maps. Furthermore, there is a nontrivial upper bound on the sum of precision and recall for continuous DR maps.

Some embodiments described herein provide a method able to quantitatively measure the degree of continuity and one-to-one with regard to an application of DR methods to data in order to produce DR quality measures. To give a concrete example, Wasserstein distance, as a continuity and one-to-one measure, can be used to analyze the quality of a number of target dimensionality reduction data visualization maps of underlying high dimensional data.

Once analysis is complete: a) a subset of the DR data visualization maps determined to exhibit degrees of fidelity (e.g., high degrees of one-to-one and continuity) above a pre-set threshold may be designated as a high-fidelity subset; and b) the specific DR methods applied to the DR data visualization maps in the high-fidelity subset may be assigned an accuracy score related to one or more features of the underlying high dimensional data. The accuracy score may be output in the form of a data set that is used to identify an estimated veracity of data as estimated by a tool, which for example, can be used downstream in relation to understanding a confidence associated with a particular identified pattern/trend, the confidence being useful in weighing outcomes or generated expected values.

Dimensionality reduction (DR) is a common and fundamental problem to many areas. Direct DR applications include information compressing, clustering, manifold learning, and data visualization. DR also happens naturally in machine learning "pipelines", such as neural networks. Where a pattern recognition method is to be applied to a high-dimension dataset, DR is often applied prior to such application to avoid 'curse of dimensionality' problems whereby the increase of the volume of space that accompanies an increase in dimensionality can cause objects within the high dimension space to appear increasingly sparse as the number of dimensions increases.

For linear dimensionality reduction (LDR) mapping methods (e.g., PCA) information loss can be characterized by the null-space, whose components are all mapped to $\{0\}$. Knowing this limitation of the linear methods, many non-linear dimensionality reduction (NLDR) methods were developed, each of which applied different methods to attempt to preserve relevant information.

These include distance preservation methods, for example multidimensional scaling (MDS), Sammon mapping, Isomap, curvilinear component analysis, kernel PCA; topology preservation methods including local linear embedding, Laplacian eigenmaps; neighborhood preservation methods including stochastic neighborhood embedding (SNE), and t-SNE. Each of these algorithms exhibits a different trade-off between loss of different types of information. For example MDS preserves global distances and sacrifices local distances, while t-SNE does the opposite.

Although more powerful, NLDR mappings still lose information. Empirical methods have been developed to capture this imperfection. For example, in the context of data visualization, precision and recall have been used to quantify the quality of the NLDR mapping from an information retrieval perspective, while other methods proposed to use trustworthiness and continuity to capture the quality of rank preservation. Other measures include projection precision score, compression vs stretching, and NLM stress vs. CCA stress.

When determining which dimensionality reduction method (or methods) to apply to a particular set of high dimensionality data in order to produce high-fidelity visualizations, it is useful to determine:
1. What is a fundamental trade-off between dimensionality reduction methods?
2. Is it quantifiable?
3. How can it be measured?

According to an embodiment of the present disclosure, the answer to each of these questions lies in analysis of continuity and one-to-one trade-off in DR. It may be useful to generalize precision and recall to continuous settings, and relate them to this trade-off.

Local perfect precision implies one-to-one, and local perfect recall is equivalent to continuity. As such, precision and recall cannot both be perfect, even locally, if the embedding dimension is lower than intrinsic dimension. A fairly tight bound can circumscribe precision+recall for a large class of maps using waist inequality. This can be related to, for example, discrete metric space embedding, manifold learning, and previous empirical NLDR quality measures. Lastly, Wasserstein distance can be applied to quantify continuity and one-to-one and score its efficiency in analyzing of data visualization.

Trade-Offs in Dimensionality Reduction

As an example, let m be the embedding dimension, X be an n dimensional manifold embedded in $\mathbb{R}^N$, where N is the ambient dimension. Let m<n<N and f: $X \subset \mathbb{R}^N \to \mathbb{R}^m$ be a DR map. The pair (x, y) will be the points of interest, where y=f(x). All sets named $U \subset X$ and $V \subset \mathbb{R}^m$ are open sets, and typically open balls. The present disclosure may use $B_r^n$ to denote a n dimension open ball with radius r. When the radius is unspecified, the open ball has unit radius. The present disclosure may also use $Vol_n$ to denote n-dimensional volume.

Invariance of Dimension, Precision and Recall Trade-Off

Two observations may be important to the present disclosure. First, if perfect precision and recall are framed under a continuous setting, they are roughly continuity and one-to-one disguised. Second, invariance of dimension states that continuity and one-to-one cannot coexist when reducing dimensions. This translates a fundamental trade-off in topological dimension theory to DR in machine learning. Formally DR may be treated as an information retrieval problem.

In a non-limiting example, for every $U \ni x$, the precision of f at U w.r.t $V \ni y$ is $$\frac{Vol_n(f^{-1}(V) \cap U)}{Vol_n(f^{-1}(V))}.$$

For every $V \ni y$, the recall of f at V w.r.t $U \ni x$, is $$\frac{Vol_n(f^{-1}(V) \cap U)}{Vol_n(f^{-1}(U))}.$$

This may generalize precision and recall from discrete to continuous cases by replacing counting with volume. The neighborhood $U \ni x$ is the relevant neighborhood containing relevant items, and $f^{-1}(V) \ni x$ is the retrieval neighborhood including retrieved items.

Continuing the example above, f achieves perfect precision if for every $U \ni x$, there exists $V \ni y=f(x)$ such that, $f^{-1}(V) \subset U$. Similarly, f achieves perfect recall if for every $V \ni y=f(x)$, there exists $U \ni x$ such that, $U \subset f^{-1}(V)$. f achieves perfect precision or perfect recall in a neighborhood W, if f reaches perfect precision or perfect recall for all $w \in W$. The oscillation for f at $x \in X$ is:

$$\omega^f(x) = \inf_U \{diam(f(U)); x \in U\}. \quad (1)$$

Note that f is continuous at point x iff $\omega^f(x)=0$ [11]. Note also that perfect recall above is almost the definition of continuity. Perfect precision can be described as a version of one-to-one acting on neighborhood.

Under the above definitions, perfect precision implies one-to-one; perfect recall is equivalent to continuity, this may be referred to herein as "geometric equivalence".

FIGS. 1A and 1B provide a set of example illustrations depicting how these two sets of concepts (discontinuity and low recall, and many-to-one and low precision) are related. As depicted in FIG. 1A, if discontinuous, the retrieved neighborhood $f^{-1}(V)$ cannot cover the relevant neighborhood U, this can result in bad recall.

As depicted in FIG. 1B, when many-to-one exists, $f^{-1}(V)$ can cover U, but also retrieves irrelevant neighborhood. Thus, calculating precision and recall for a given point's neighbors can be thought of as calculating the "degree" of continuity or one-to-one.

In some embodiments, the trade-off between precision and recall can be expressed as follows. Let n>m, $X \subset \mathbb{R}^N$ be an arbitrary n-dimensional sub-manifold and f: $X \to \mathbb{R}^m$ be a dimensionality reduction map. In such a case, it is not possible to have perfect precision and recall in any small neighborhood.

FIG. 1C, provides an example illustration showing dimensionality of $f^{-1}(V)$ might be smaller than dimensionality of U, where f maps the internal of left circle to the right circle, except the perimeter of the left circle is mapped to the solid line on the right. Precision of the discontinuous map with regard to length (1-D) is finite, but zero with regard to area. As a result, computing with regard to length makes sense in this case.

Although it might seem surprising that it may be impossible to achieve perfect precision and recall locally by sacrificing at other places, it is instructive that a DR map $\hat{f}$ learned on finite samples $\{X_n\}$ from a manifold $X \subset \mathbb{R}^N$, even if $\hat{f}$ achieves perfect precision and recall on all of $\{X_n\}$, must fail on some other samples $\{X'_n\}$ from X. This is because in any continuous region on X, f must fail to achieve both perfect precision and recall. In this sense, the perfect precision and recall of $\hat{f}$ on $\{X_n\}$ is misleading, because $\hat{f}$ fails to generalize on X anywhere, even locally.

Waist Inequality, Precision and Recall Trade-Off

There may be qualitative incompatibility between precision and recall. However, the invariance of dimension (IVD)-based derivations do not show how much continuity vs. one-to-one (and precision vs recall) conflict. Waist inequality may instead allow generalization to a more quantitative setting.

As a non-limiting example demonstrative of waist inequality, let m<n. If f is a continuous map from the unit cube, $[0, 1]^n$ to $\mathbb{R}^m$, then one of the inverse images of f has (n−m) volume of at least 1. Stated more precisely, there is some $y \in \mathbb{R}^m$ such that $Vol_{n-m}(f-1(y)) \geq 1$. When the present disclosure replace the unit cube by unit ball B, the inequality becomes: $Vol_{n-m}(f-(y)) \geq Vol_{n-m}(B^{n-m})$.

In a non-limiting example demonstrative of maximum precision and recall (and some limits thereof), let U be a fixed open set: the present disclosure may define the maximum precision of f(x) at U, $$Precision^f(U) = sup_{diam(V)>0} \frac{Vol_k(f^{-1}(V) \cap U)}{Vol_k(f^{-1}(V))}$$

where k is the dimension that makes the expression finite, and n−m<k≤n; the example may further define $$Precision_0^f(U) = \frac{Vol_{n-m}(f^{-1}(y) \cap U)}{Vol_{n-m}(f^{-1}(y))}.$$

Let V be fixed: the example may define the maximum recall of f(x) at V, $$Recall^f(V) = sub_{diam(U)>0} \frac{Vol_{n-m}(f^{-1}(V) \cap U)}{Vol_n(U)}.$$

There may be asymmetry in the definition of precision and recall. In the case of precision, it may be necessary to separately define the nonzero k dimensional volume and the degenerate case where $f_{-1}(V)=f^{-1}(\{y\})$.

The reason is that $f^{-1}(V)$ is in the denominator and it may not have n dimensional volume, as shown in FIG. 1C. As for Precision$_0^f$, the present disclosure may not only need limit but also continuity at f(x).

In a non-limiting example demonstrative of a definition of minimum and maximum precision and recall, let ∈>0 be some fixed number. The present disclosure may define the minimum and maximum precision Precision$_\in$(f(x)) and correspondingly mini-max recall Recall$_\in$(f(x)) to be min (inf$_{diam(U)}$<$_\in$(Precision$_U$(f(x))), Precision$_{U_0}$(f(x))) and inf$_{diam(V)}$<$_\in$Recall$_V$(f(x))).

In a non-limiting example demonstrating an embodiment of the current disclosure, it can be said that f achieves observably perfect precision and observably perfect recall when their mini-max precision and recall are both 1. f can be said to achieve observably perfect precision or observably perfect recall in a neighborhood W, if f reaches observably perfect precision or observably perfect recall for all w ∈ W. f can be said to be observably continuous at x if the nonzero oscillation at x is caused by a zero set. f can be said to be observably one-to-one if the place where it fails to be 1-1 has zero k dimensional volume measure for all k≥n−m.

More precisely, it is almost everywhere 1-1 if for all k≥n−m for every y ∈ℝ$^m$, Vol$_k$f$^{-1}$(y)=0. Under these definitions, observably perfect precision can imply observable one-to-one; observably perfect recall is equivalent to observable continuity. Further, it may not be possible to have observably perfect precision and recall in any small neighborhood.

According to some embodiments, the biggest difference may be the relaxation of definition of perfect precision and recall. This may apply better to computation, as it implies precision+recall<2.

The previous example may give a trivial bound on the sum of precision and recall on arbitrary DR maps. Two key properties may lead to tighter bounds on the whole domain. These can be satisfied by many DR maps (e.g., PCA, neural networks, etc.). In even greater generality, a greater bound can be given for continuous DR maps, but only on part of the domain guaranteed by waist inequality.

According to an embodiment, a bound may be created as follows: Let n>m, $B_R^n$ be a ball with radius R, f: $B_R^n \to \mathbb{R}^m$, $r_U$ and $r_V$ be radii of U and V, $f^{-1}(y)+r_V$ denote a tubular neighborhood of $f^{-1}(y)$. When f satisfies the following: there exists an absolute constant C for almost every y ∈ $B_R^n$, there is a constant α=α(y)>0 depending on y such that:

$$Vol_n(f^{-1}(V)) = Vol_n(f^{-1}(y+r_V)) \geq CVol_n(f^{-1}(y)+r_V) \geq$$

$$.4C\pi^2 \frac{\pi^{n-m/2}}{\Gamma\left(\frac{n-m}{2}+1\right)} \frac{\pi^{m/2}}{\Gamma\left(\frac{m}{2}+1\right)} (\alpha R)^{n-m} p^m(r_V).$$

Then for every y, continuous precision and recall as defined above, obey the following inequality on $f^{-1}(y)$:

$$Precision(U, V|) + Recall(U, V) \leq \qquad (2)$$

$$1 + \frac{1}{4C\pi^2} \frac{\Gamma\left(\frac{n-m}{2}+1\right)\Gamma\left(\frac{m}{2}+1\right)}{\Gamma\left(\frac{n}{2}+1\right)} \left(\frac{r_U}{\alpha R}\right)^{n-m} \frac{r_U^m}{p^m(r_V)}$$

where $p^m(r_V)$ is a polynomial whose lowest degree is m.

The only way to cheat this bound may be to have many relevant items and only retrieving a tiny amount thereof to get high precision. In practice, the number of relevant items ($r_U$) can often be smaller than the number of retrieved items ($r_V$), while number of relevant items should be much fewer than total items (R). Thus the sum of precision and recall becomes much smaller than two.

In some embodiments, a large number of continuous DR maps may satisfy the above properties, and hence the bound, up to a constant factor. A linear DR map can be decomposed as a rotation, projection and a positive semi-definite matrix. Rotation may not alter fiber volume, projection increases fiber dimension, and a positive semi-definite matrix may distort the fiber volume by its eigenvalues.

These may change only the constant C and α above. Next, linear maps may be composed with nonlinearity such as sigmoid or rectified linear unit (ReLu) (leaky or not). Since the nonlinearity may not reduce dimensions, they again change only C and α by the Jacobian's determinant. When deep neural networks are formed by composing them, only C, α and the gamma constants Γ(*) may be affected. Intuitively a ReLu neural network with finite layers and width may cut the domain into piecewise linear regions, which may worsens the constants above. However the polynomial bound may remain unaffected, so long as U is smaller than cut domains.

The following may remain true for even a larger class of continuous DR maps, but the bound may be guaranteed to hold only on $f^{-1}(y)$, for some y. It may not be bound on all fibers: Let n>m, f: $B_R^n \to \mathbb{R}^m$ be a continuous DR map, where R is the radius of the ball $B_R^n$. Let $f^{-1}(y)$ denote a large fiber, as noted in the theorem above, and $r_U$ and $r_V$ be radii of U and V. Consider continuous maps satisfying $Vol_n(f^{-1}(V))=Vol_n(f^{-1}(y=r_V))\geq CVol_n(f^{-1}(y)+r_V)$, for some constant C (This is true for Lipschitz functions). Then continuous precision and recall, as defined above, obey the following inequality on $f^{-1}(y)$:

$$Precision(U, V) + Recall(U, V) \leq$$

$$1 + \frac{1}{4C\pi^2} \frac{\Gamma\left(\frac{n-m}{2}+1\right)\Gamma\left(\frac{m}{2}+1\right)}{\Gamma\left(\frac{n}{2}+1\right)} \left(\frac{r_U}{R}\right)^{n-m} \frac{r_U^m}{p^m(r_V)}, \text{ where } p^m(r_V)$$

Is a polynomial whose largest degree is m.

Note that a similar bound can be derived for a cube instead of a ball. The unit cube or unit ball assumption for the DR map domain may not lose generality when domain is finite. As a non-limiting example, data is often normalized to $[0, 1]^N$ or $[-1, 1]^N$, where N is the ambient dimension. However, this may be bound is on the intrinsic dimension n. When n<<N and the ambient dimension N is used in place, the bound may become much smaller than it should be, as the low precision happens on places where observe very few data are observed. This then may become a misleading inequality. To apply this in practice, a good estimate on intrinsic dimension may be needed. Finally, there may be a guarantee on existence of $f^{-1}(y)$ satisfying the bound, not on the whole data domain. To derive an average bound over the domain, the distribution of fiber volume may be needed.

Waist inequality, above, may be a quantitative version of invariance of dimension (IVD). Related to the present disclosure, this may link another quantitative IVD (large fiber lemma) to DR. It may quantify continuity and one-to-one trade-off with regard to large distances (e.g., arbitrarily far points in high dimension can become arbitrarily close in low dimension). In contrast, the present disclosure may quantify continuity and one-to-one trade-off by large volumes.

The method using large distances may identify the potential pitfall of continuous DR maps and propose discontinuous DR maps to avoid the curse of IVD, but does not study the potential pitfalls of discontinuous DR maps. Distance and volume perspectives also appear later with regard to computation below.

Relation to Metric Space Embedding and Manifold Learning

Embodiments of the present disclosure have focused on m<n<N so far, while in discrete metric space embedding and manifold learning, n≤m<N is common. The relations are discussed below.

In an embodiment, given a finite metric space $X_k$ with k points, Bourgain's embedding may guarantee the metric structure can be preserved with distortion O(log n) in $l_p^{O(\log^2 n)}$. When $X_k \subset l_2$, Johnson-Lindenstrauss lemma improves distortion to $(1+\epsilon)$ in $l_2^{O(\log(n/\epsilon^2))}$. These bounds hold for all pairwise distances. In manifold learning, the finite metric space $X_k$ is treated as samples from a smooth or Riemannian manifold X with intrinsic dimension n and one is interested in embedding X in $l_2$ while preserving local isometry. By Whitney embedding, X can be smoothly embedded into $\mathbb{R}^{2n}$. By Nash embedding, a compact Riemannian manifold X can be isometrically embedded into $\mathbb{R}^{p(n)}$, where p(n) is a quadratic polynomial.

Hence the task in manifold learning is well posed: one seeks an embedding f: $X \subset \mathbb{R}^N \to \mathbb{R}^m$ with m≤2n<<N in the smooth category or m≤p<<N in the Riemannian category. Note that these embeddings usually do not preserve pairwise distances with a fixed distortion factor, unlike Bourgain embedding or Johnson-Lindenstrauss lemma. Preserving pairwise distances in the manifold setting appears to be very hard, in that embedding dimension may grow more than exponentially in n.

In some embodiments, viewing precision and recall as losses, their tension with dimensionality may be studied. This may relate to both metric space embedding and manifold learning. While other methods may look for lowest embedding dimension subject to certain loss (e.g., smoothness, isometry, etc.), some embodiments focus on minimizing certain loss subject to a fixed embedding dimension constraint (e.g., visualization, neural network, etc.). In these cases, desired structures may break, but it may desirable that they break as little as possible.

In some embodiments, like DR in metric space embedding, the present disclosure may not aim to recover the smooth or isometric structure. Rather, preserving precision and recall while reducing the high ambient dimension in finite sample may be a focus of the present disclosure. Unlike metric space embedding, which concerns pairwise properties like distances, precision and recall are pointwise.

In some embodiments, like DR in manifold learning, the present disclosure does not focus on preserving local notions such as continuity and one-to-one. Rather, the present disclosure may be focus on embedding in the topological category, instead of smooth or Riemannian category: a topological manifold with intrinsic dimension n can be embedded into $\mathbb{R}^{2n}$. Using geometric equivalence, above, and homeomorphism is an open map (so one-to-one⇒perfect precision): In some embodiments, when m≥2n, there exists a DR map that achieves perfect precision and recall.

This may be in contrast with the Riemannian isometric embedding where the lowest embedding dimension grows polynomially. A practical implication may be that, the present disclosure can reduce a lot more dimensions if only required to focus on precision and recall. When n<m<2n, neither waist inequality nor topological embedding gives a conclusive analysis. This heavily depends on the unknown manifold X itself. For such cases, the empirical measure in the next section can measure whether a particular embedding preserves continuity and one-to-one.

Quantitative Measures of Dimensionality Reduction: Previous Empirical Measures

Similar to measures of large distances vs large volumes, previous empirical measures fall into the categories of: a) volume-based; and b) distance-based. Aspects of the present disclosure may, under continuous settings, unify them with continuity and one-to-one. Volume-based methods may contain discrete precision and recall and rank based measures. They may capture volume overlapping, but can be less sensitive to distance distortions. In practice, volumes need to be estimated from discrete samples. This can become difficult in high dimensions due to sampling inefficiency and difficulties in computation of volume and intersection.

In some embodiments, as a natural baseline, discrete precision vs. recall may exhibit additional problems. First, if number of neighbors in high and low dimension are the same, precision and recall are always the same. Setting number of neighbors to make them more informative is nontrivial. Also, they are not robust under approximate nearest neighbor search. On the other hand, distance-based measures do not model the volume or geometry of the neighbors explicitly.

Wasserstein Many-to-One, Discontinuity and Cost

To capture both volume and distance perspectives, some embodiments derive Wasserstein distance. The 235 minimal cost for mass-preserving transportation between regions, the Wasserstein $L^2$ distance is:

$$W_2(\mathbb{P}_a, \mathbb{P}_b) = \inf_{\gamma \in \Gamma(\mathbb{P}_a, \mathbb{P}_b)} \mathbb{E}_{(a,b) \sim \gamma}[\|a - b\|_2^2]^{1/2} \quad (3)$$

where $\Gamma(\mathbb{P}_a, \mathbb{P}_b)$ denotes all joint distributions $\gamma(a, b)$ whose marginal distributions are $\mathbb{P}_a$ and $\mathbb{P}_b$. Intuitively, among all possible ways of transporting the two distributions, it looks for the most efficient one.

In some embodiments, with the same intuition, the present disclosure may use Wasserstein distance between U and $f^{-1}(V)$ for the degree of many-to-one. This not only may capture similar overlapping information as the set-wise precision:

$$\frac{Vol_n(f^{-1}(V) \cap U)}{n(f^{-1}(V))},$$

but also may capture the shape differences and distances between U and $f^{-1}(V)$.

Similarly, Wasserstein distance between f(U) and V may capture the degree of discontinuity. $W_2$ captures both continuity and one-to-one. In practice, the present disclosure may calculate Wasserstein distances between two groups of samples, $\{a_i\}$ and $\{b_j\}$. For example, the present disclosure may solve $$\min_m \sum_i \sum_j d_{i,j} m_{i \to j}, \text{ such that: } m_{i \to j} \geq 0, \sum_i m_{i \to j} = 1, \sum_j m_{i \to j} = 1, \quad (4)$$

where $d_{i,j}$ is the distance between $a_i$ and $b_j$ and $m_i \to_j$ is the mass moved from $a_i$ to $b_j$. When $\{a_i\} \subset U$ and $\{b_j\} \subset f^{-1}(V)$, it is Wasserstein many-to-one. When $\{a_i\} \subset f(U)$ and $\{b_j\} \subset V$, it is Wasserstein discontinuity. The average of many-to-one and discontinuity is Wasserstein cost.

Figure 4:
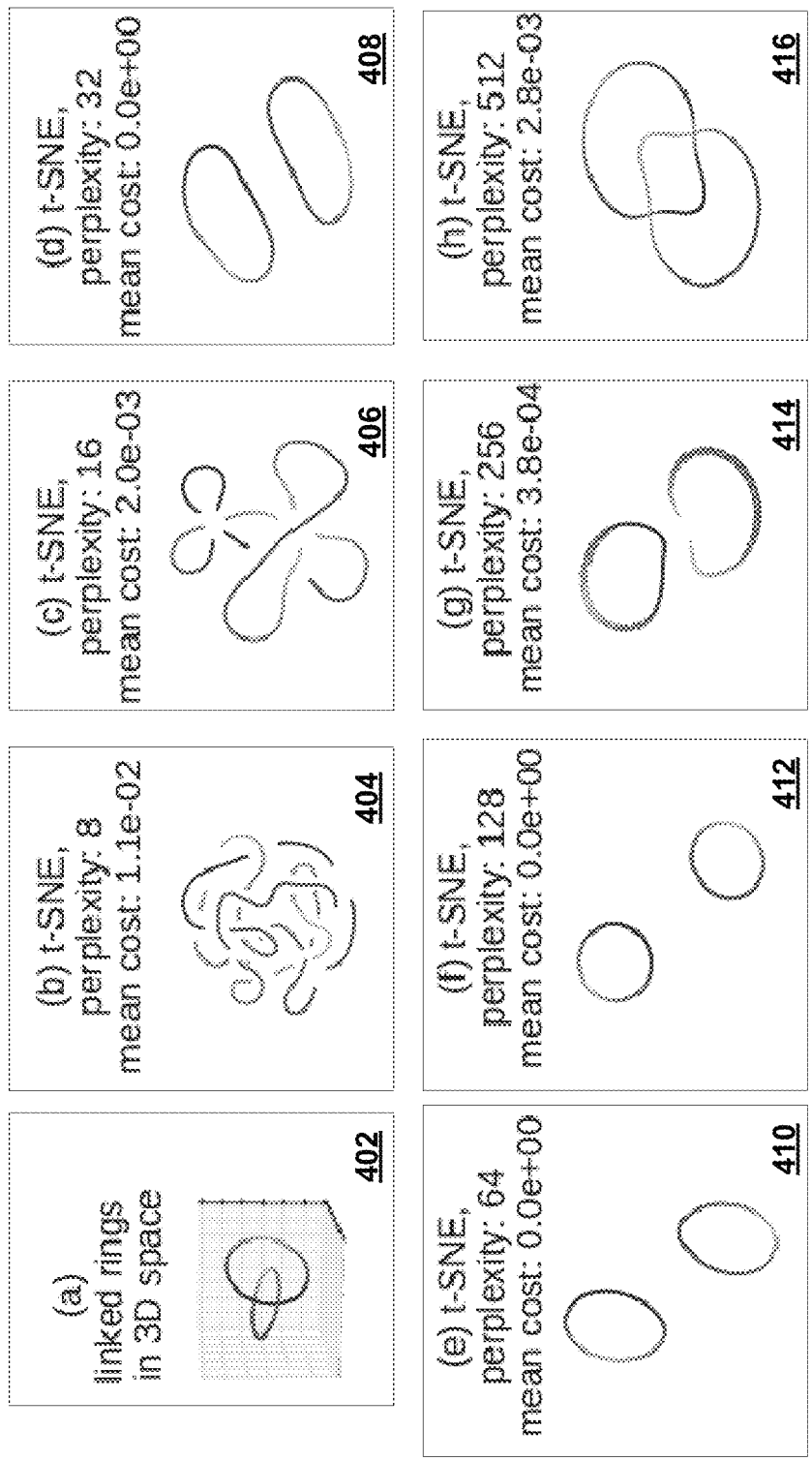
FIG. 4 is an example illustration showing a t-SNE of 3D "linked rings" with different perplexities and their average Wasserstein costs.

Referring now to FIG. 4, an illustration of t-SNE of 3D "linked rings" with different perplexities and their average Wasserstein costs may be provided (402-416).

Figure 5:
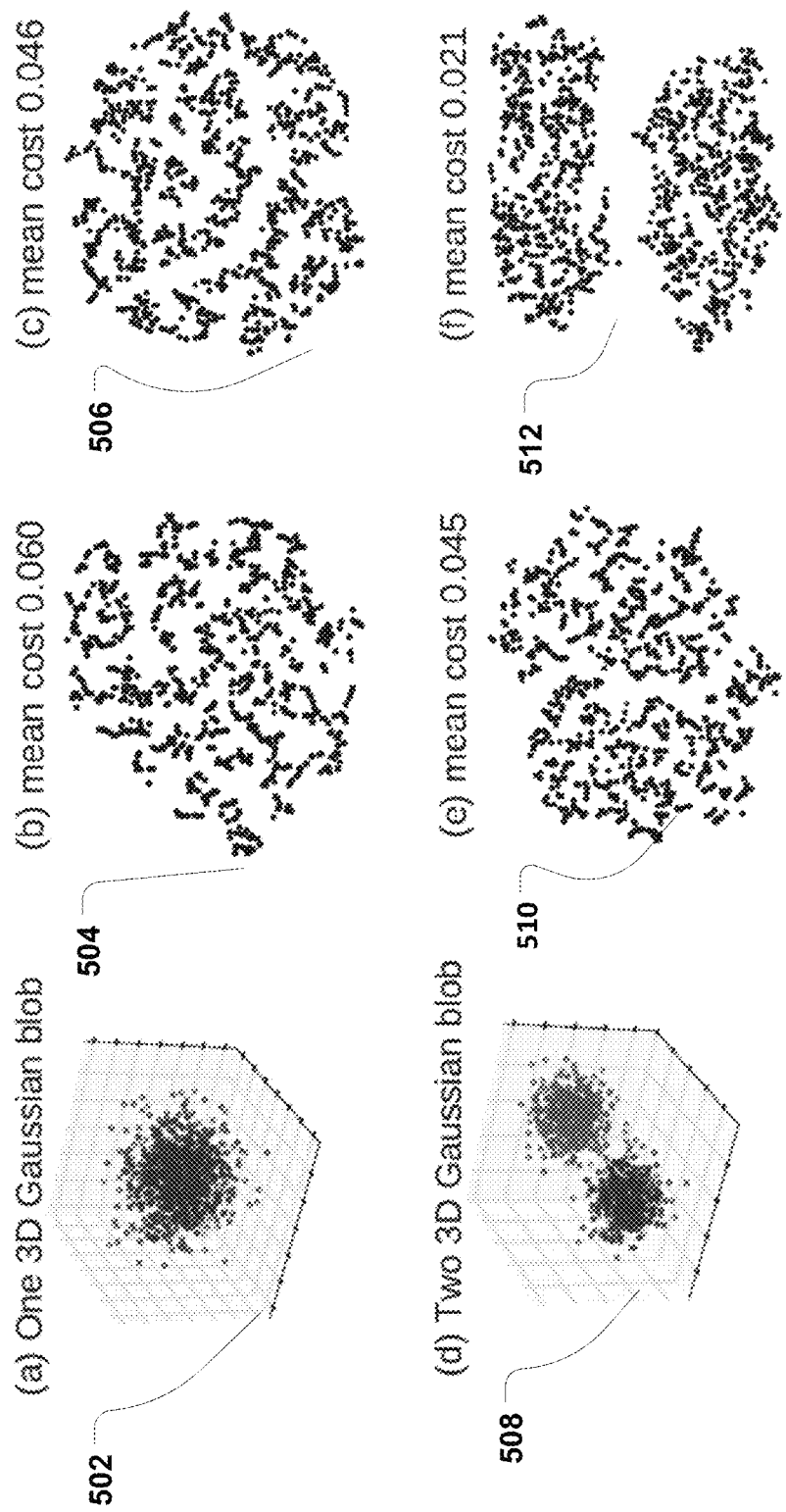
FIG. 5 is an example illustration showing the Wasserstein cost distinguish various misleading visualizations.

Referring now to FIG. 5, an illustration of Wasserstein cost distinguish misleading visualization: 502 one 3D Gaussian blob; 504 t-SNE of one blob with cost 0.060; 506 t-SNE of one blob with cost 0.046; 508 two 3D Gaussian blobs; 510 t-SNE of two blobs with cost 0.045; and, 512 t-SNE of two blobs with cost 0.021.

In some embodiments, various visualization maps are analyzed using Wasserstein many-to-one, discontinuity, and cost. Embodiments may use, for example, 10 nearest neighbors of x in the original high dimensional space as samples from U, the 10 corresponding points in the low dimensional projection space as samples from f(U). Similarly, the present disclosure may take 10 nearest neighbors of y in low dimension as samples from V, the 10 corresponding points in high dimension as samples from $f^{-1}(V)$. Wasserstein distance itself may not be scale invariant, data may be normalized the data by the average pairwise distance. A tool implementing the method may also calculate discrete precision and recall with the same set of samples. Only precision may be discussed since discrete precision and recall may be the same under this setting. Datasets used in examples depicted in the figures may include toy data, MNIST digits, and News Aggregator Datasets (NewsAgg), which may include 422,352 news titles.

Analyze Individual Visualization Map

Figure 2:
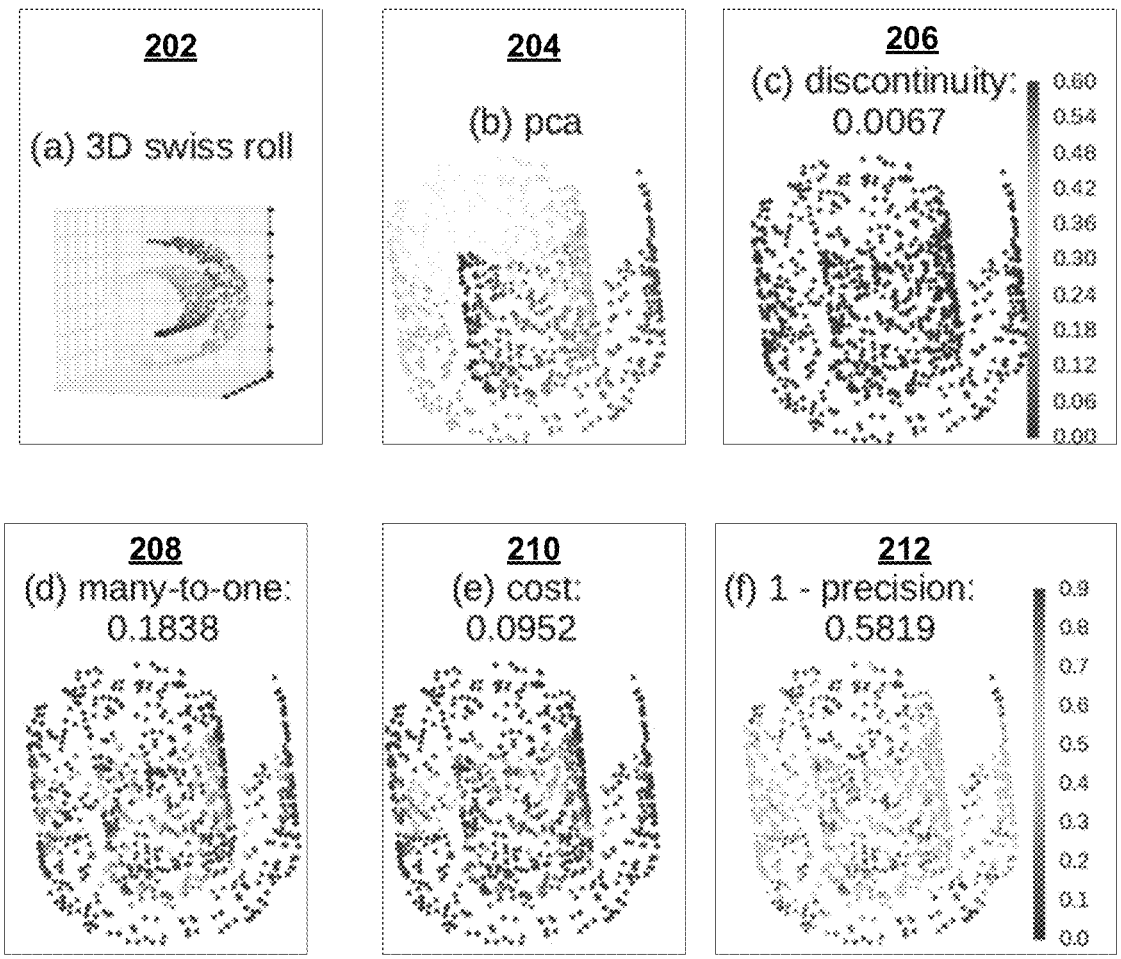
FIG. 2 is an example illustration showing visualizations of Wasserstein and precision measures on a PCA output.

Referring now to FIG. 2, there may be provided an illustration of Wasserstein measures compared with discrete precision. PCA 204 may be a continuous map with low discontinuity measures. At the same time, PCA maps some non-neighbor points together, and they have high degree of many-to-one. In contrast, discrete precision 212 can only tell general quality, but not distinguish discontinuity from many-to-one 208.

Figure 3:
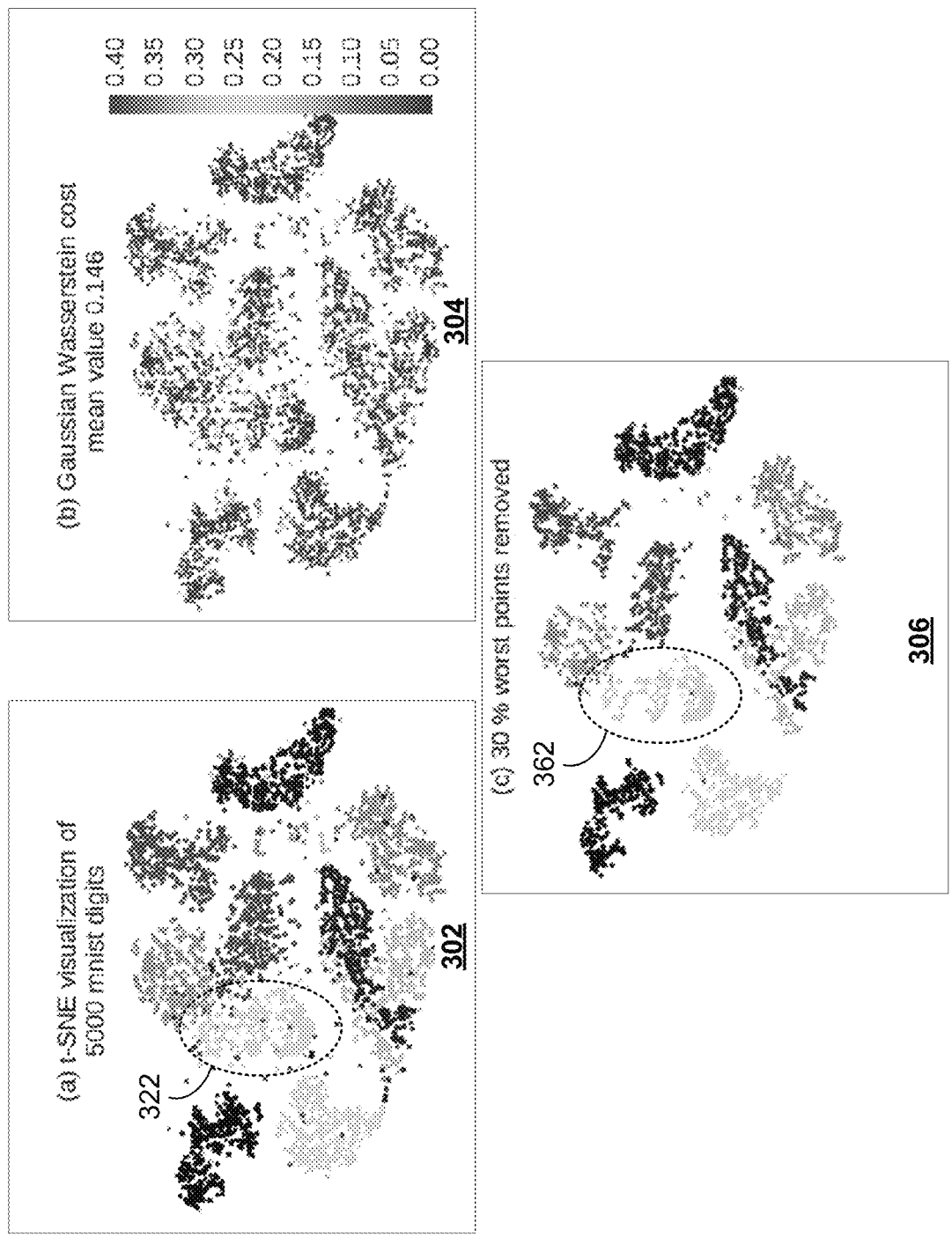
FIG. 3 is an example illustration showing a t-Distributed Stochastic Neighbor Embedding (t-SNE) of 5000 Modified National Institute of Standards and Technology database (MNIST) digits and pointwise map of Wasserstein discontinuity, many-to-one, and cost.

Referring now to FIG. 3, there is provided an example illustration of a t-SNE of 5000 MNIST digits 302 and pointwise map of Wasserstein discontinuity, many-to-one and cost. 302, t-SNE (color coding or shading may be used to represent classes); 304, cost map; 306, t-SNE with 30% worst point removed.

In some embodiments, illustrations may distinguish unreliable points both by type and degree. 306 may show removing "bad" points can help discovering clusters as they may mostly correspond to different classes. One exception may be that the green cluster 322 in the middle of 302 is divided into 3 clusters 362 in 306, which depict visualizations of different hand-written digit 5's with different writing styles.

Compare Visualization Maps

In some embodiments, the tool is configured to analyze t-SNE with different hyper-parameters. FIG. 4 depicts the t-SNE maps on linked rings with different perplexities (402-416). In this case, "Non-intersecting" may be an essential local information, while "link" may be a "global" property that is not captured by the local quality measure. As shown in 408, 410, and 412, t-SNE maps with perplexity 32, 64, 128 all reconstruct 2 rings with zero Wasserstein costs. In contrast, t-SNE with perplexity 512 (see 416) reconstructs 2 rings, but breaks the original local structure at the intersection, thus has higher costs. The present disclosure may show additional results of evaluating t-SNE maps with different perplexities on MNIST digits, NewsAgg, and also on different dimensionality reduction methods on S-curve, Swiss roll and MNIST digits.

Figure 6:
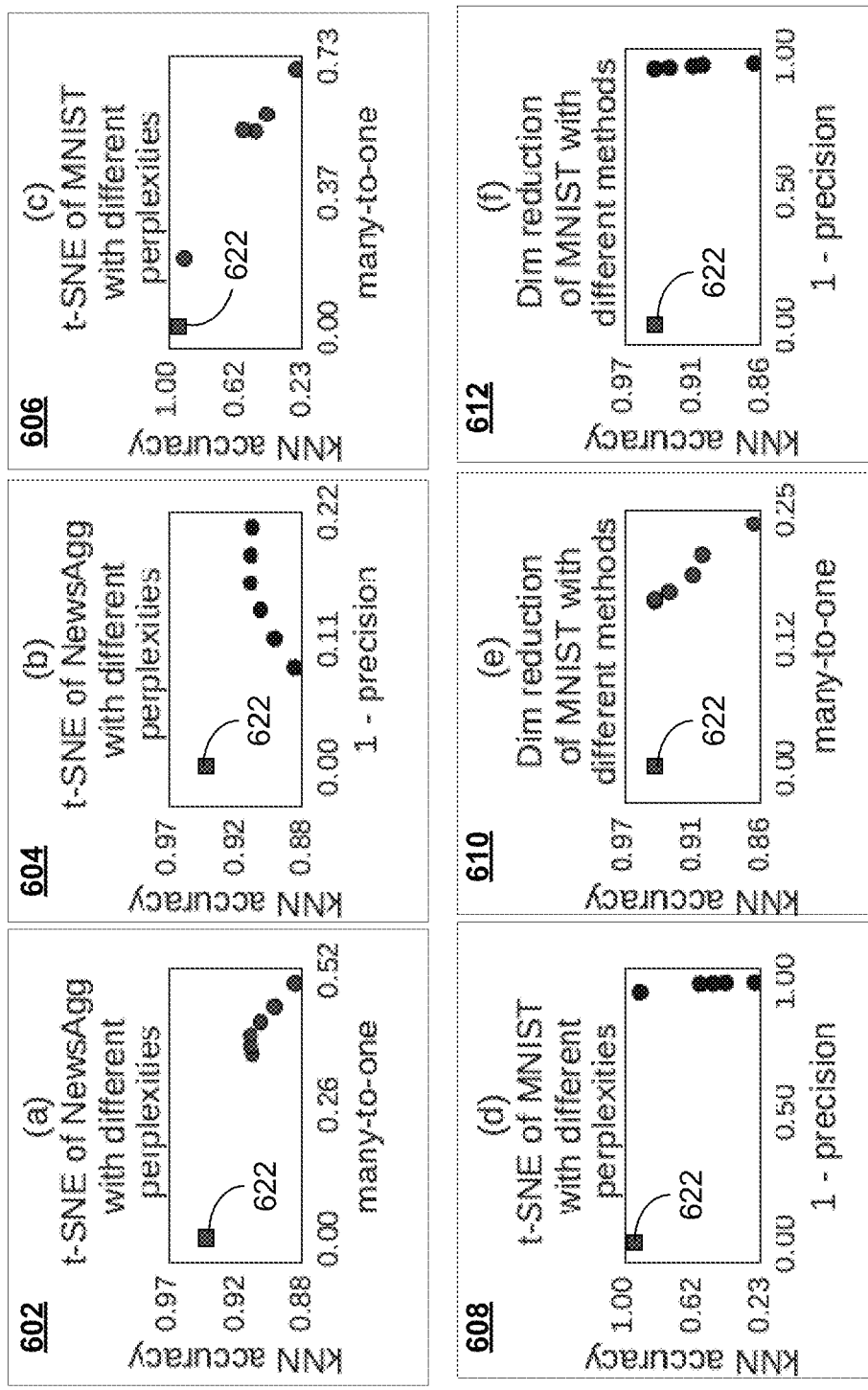
FIG. 6 is an illustration showing negative correlation between Wasserstein many-to-one with K Nearest Neighbor (kNN) accuracy.

Referring now to FIG. 6, negative correlation between Wasserstein many-to-one with kNN accuracy may be depicted. Green squares 622 may indicate kNN accuracy in original space. Circles may indicate different dimensionality reduction results.

Misleading visualizations can occur due to suboptimal hyper-parameter. In 504 and 510, a single 3D Gaussian blob and double 3D Gaussian blobs have similar t-SNE maps under certain parameters. As shown in 506 and 512, choosing the visualization with lowest cost can help disambiguate.

Correlation Between Many-to-One and K-Nearest Neighbor Classification

In some embodiments, assuming kNN has a high accuracy before dimension reduction, for kNN to be accurate in low dimensional space on point y, it is important that y's neighbors correspond to $f^{-1}(y)$'s neighbors, which means y needs to have a low degree of many-to-one.

As shown in FIG. 6, 602, 606, and 610 respectively show many-to-one vs kNN accuracy under t-SNE of NewsAgg with different perplexities, t-SNE of MNIST with different perplexities and dimensionality reduction of MNIST with different methods, including PCA, MDS, LLE, Isomap and t-SNE. Similarly 604, 608, and 610 show results on 1—Precision vs kNN accuracy. As depicted, many-to-one has strong negative correlation with kNN accuracy. While for precision the relationship is either non-existent, in 604, or weak, in 608 and 612.

In some embodiments, a fundamental trade-off is outlined between nonlinear dimensionality reduction as continuity vs one-to-one. From this perspective, the example may show that for any dimension reduction mapping, precision and recall cannot both be perfect in a volumetric sense under continuous setting. Furthermore, the example approach may quantify this tradeoff by proving a nontrivial bound on the sum of precision and recall for continuous mappings. To measure the trade-off, the tool is configured to use Wasserstein distances to measure discontinuity and many-to-one, because they capture both distance and volume perspective of continuity and one-to-one. Lastly the tool may indicate their effectiveness in analyzing data visualization. The relationship between previous empirical DR quality measures, discrete metric space embedding and manifold learning is noted in some embodiments.

Figure 7:
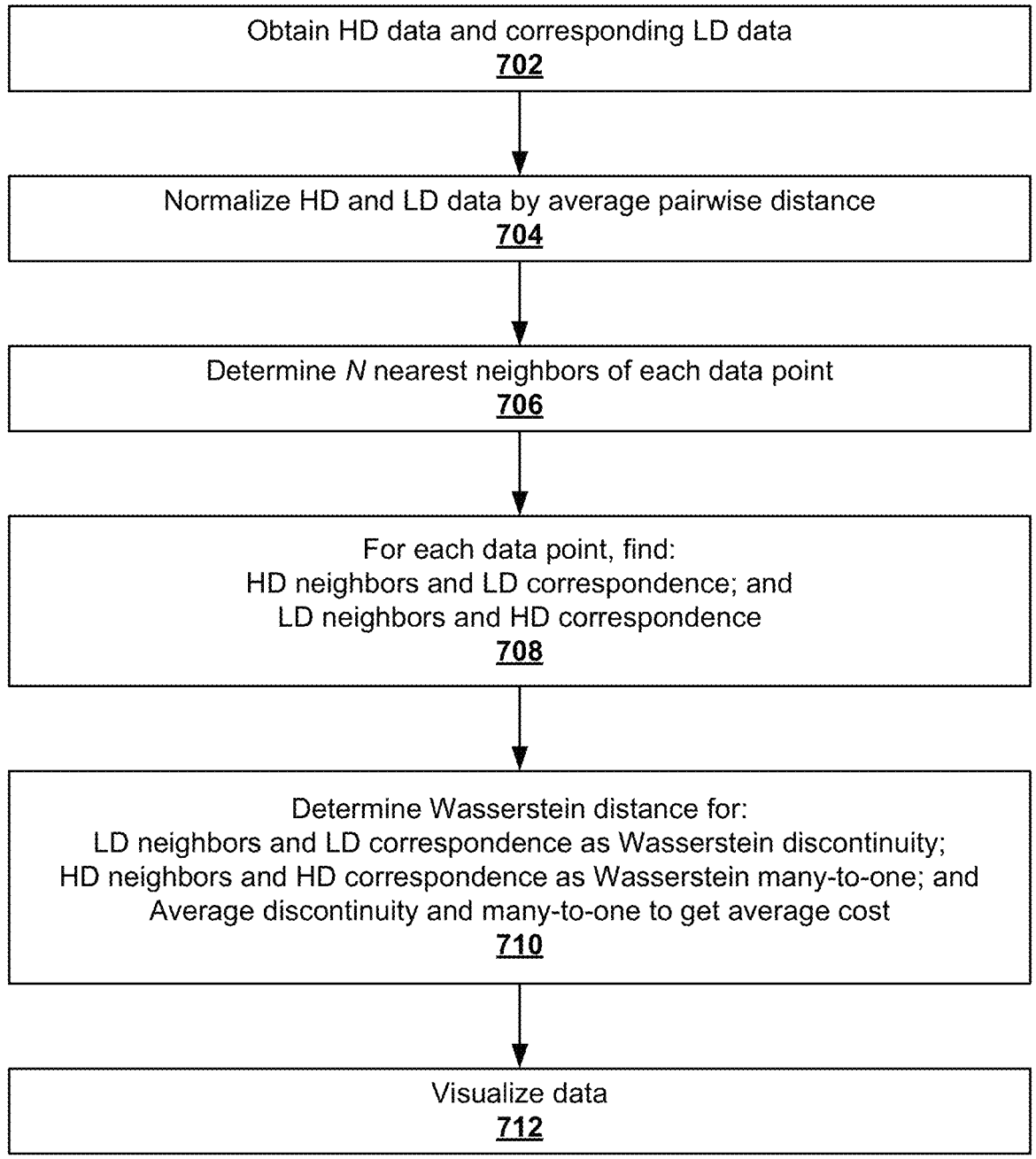

Referring now to FIG. 7, there is provided a flow diagram depicting an example method of measuring a level of fidelity between a target DR data visualization map and underlying high dimensional data. At 702 underlying high dimensional data and the low dimensional visualizations thereof may be retrieved. Low dimensional points may be generated by another algorithms (e.g., t-SNE, PCA, etc.).

At 704, the data may be normalized by average pairwise distance for both the high and low dimensionality. At 706, the nearest neighbors of each data point are found for both the high and low dimensionality. At 708, each data point's high dimensionality neighbors $\{a'\_i\}$ and their low dimensionality visualization correspondents $\{a\_i\}$ are identified, and each data point's low dimensionality visualization neighbors $\{b'\_i\}$, and their high dimensionality data set correspondents $\{b\_i\}$ are identified.

At 710 Wasserstein distance between $\{b'\_i\}$ and $\{a\_i\}$ is determined as Wasserstein discontinuity; Wasserstein distance between $\{a'\_i\}$ and $\{b\_i\}$ is determined as Wasserstein many-to-one; and average Wasserstein distance between Wasserstein distance discontinuity and many-to-one is processed to determine an average cost. For example, see equation (4) above. At 712, the quality measures are visualized with unique identifiers (e.g., color coding or shading).

Figure 8:
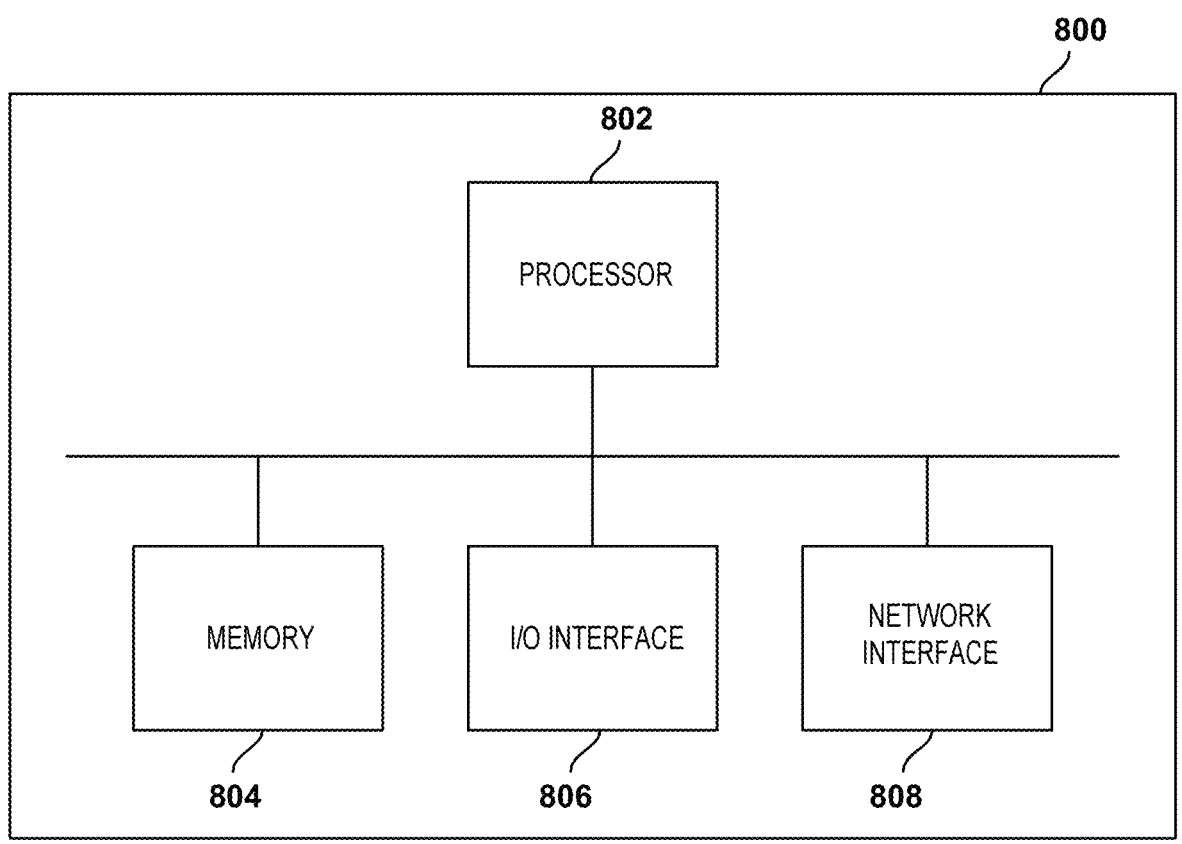
FIG. 8 is a schematic diagram of a computing device.

FIG. 8 is a schematic diagram of computing device 800, exemplary of an embodiment. As depicted, computing device 800 includes at least one processor 802, memory 804, at least one I/O interface 806, and at least one network interface 808. The computing device 800 is configured as a tool for assessing data visualizations.

Each processor 802 may be a microprocessor or microcontroller, a digital signal processing (DSP) processor, an integrated circuit, a field programmable gate array (FPGA), a reconfigurable processor, a programmable read-only memory (PROM), or any combination thereof. The processor 802 may be optimized for graphical rendering of visualizations and/or computations of distances and determinations thereof.

Memory 804 may include a computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM).

Each I/O interface 806 enables computing device 800 to interconnect with one or more input devices, such as a keyboard, mouse, camera, touch screen and a microphone, or with one or more output devices such as a display screen and a speaker. I/O interface 806 may also include application programming interfaces (APIs) which are configured to receive data sets in the form of information signals, including data visualizations, coordinates and representations thereof, underlying high dimensionality data sets (e.g., vectors, matrices, linked lists, data structures).

Each network interface 808 enables computing device 800 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others. Network interface 808, for example, may be used to communicate the information signals, including data visualizations, coordinates and representations thereof, underlying high dimensionality data sets (e.g., vectors, matrices, linked lists, data structures).

Referring now to FIG. 9, there is provided an example computerized method of assessing the fidelity of low dimensional visualizations of high dimensional data sets, according to some embodiments. At 902, a processor receives a high dimensional data set and at least one low dimensional visualization thereof. At 904, the processor proceeds by normalizing by average pairwise distance, both the high dimensional data set and the at least one low dimensional data visualization.

At 906, the processor determines the nearest neighbors for each data point for both the high dimensional data set and the at least one low dimensional visualization. At 908, the processor identifies each data point's neighbors in the high dimensionality data set $\{a'\_i\}$ and their low dimensional data visualization correspondents $\{a\_i\}$. At 910, the processor identifies each data point's neighbors in the low dimensional data visualization $\{b'\_i\}$ and their high dimensional data set correspondents $\{b\_i\}$.

At 912, the processor determines: distance between $\{b'\_i\}$ and $\{a\_i\}$ as Wasserstein discontinuity; Wasserstein distance between $\{a'\_i\}$ and $\{b\_i\}$ as Wasserstein many-to-one; and average Wasserstein distance between Wasserstein distance discontinuity and many-to-one as an average cost. At 914, the processor transmits quality measures, as well as one or more low dimensionality visualizations producing quality measures above a pre-set threshold to an output. At 916, the processor stores the quality measures in a data structure located on memory or a data storage device, and at least one identifier of the high dimensional data set in a memory to optimize the processor's future performance of the method.

Figure 10:
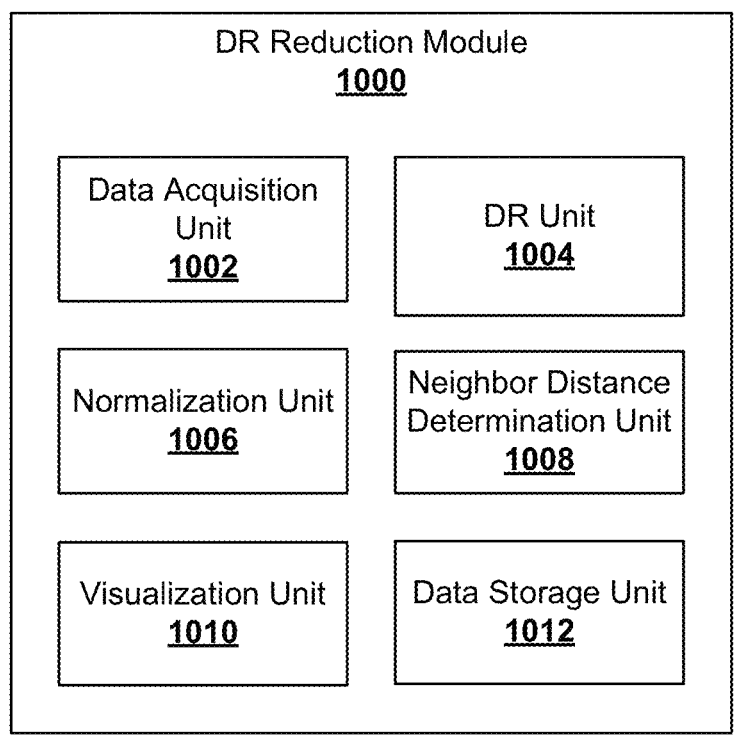
FIG. 10 illustrates, in a component diagram, an example of a dimension reduction integrity determination module, in accordance with some embodiments.

FIG. 10 illustrates, in a component diagram, an example of a dimension reduction integrity determination module 1000, in accordance with some embodiments. The module 1000 comprises a data acquisition unit 1002, a dimension reduction unit 1004, a normalization unit 1006, a neighbor distance determination unit 1008, a visualization unit 1010, and a data storage unit 1012. The data acquisition unit 1002 may obtain high dimensional data from data sources. For example, a financial institution may obtain client data from one or more databases. The client data may comprise a high dimensionality making visualization cumbersome. The dimension reduction unit 1004 may apply a dimension reduction algorithm to the data. For example, the dimension reduction results in a corresponding low dimensional data set for the same client data. The normalization unit 1006 may normalize the data by average pairwise distance for both the high dimensional data and the low dimensional data, respectively.

The neighbor distance determination unit 1008 may find N nearest neighbors of each data point for both the high dimensional (HD) data and the low dimensional (LD) data, respectively. The neighbor distance determination unit 1008 may then find, for each data point: 1) that data point's HD neighbors $\{a\_i\}$ and their LD correspondence $\{a'\_i\}$, as described above; and 2) that data point's LD neighbors $\{b\_i\}$ and their HD correspondence $\{b'\_i\}$, as described above. The neighbor distance determination unit 1008 may then determine Wasserstein distance: 1) between $\{b\_i\}$ and $\{a'\_i\}$ as Wasserstein discontinuity; 2) between $\{a\_i\}$ and $\{b'\_i\}$ as Wasserstein many-to-one; and 3) average discontinuity and many-to-one to get an average cost. The Wasserstein distance determinations may be performed respectively using equation (4) above. The visualization unit 1010 may visualize the quality measures, optionally including color coding or shading.

A quality/fidelity may be scored by determining whether the neighbours have changed between the dimensionality-reduced visualizations and the underlying data set, and quantifying any such change by one or more factors. An algorithm achieving a quality/fidelity score over a threshold may be deemed to be sufficiently reliable for the data set. The data storage unit 1012 may store the HD data, LD data and average costs associated with one or more DR algorithms with respect to the data. Thus, future reference to the average costs may allow for a selection of an optimal DR algorithm.

Different DR algorithms may be more reliable for different data sets. The process may be repeated for different dimension reduction algorithms. Once the process complete for various DR algorithms, then: a) a subset of the DR data visualization maps determined to exhibit degrees of fidelity (e.g., high degrees of one-to-one and continuity) above a pre-set threshold may be designated as a high-fidelity subset; and b) the specific DR methods applied to the DR data visualization maps in the high-fidelity subset may be assigned an accuracy score related to one or more features of the underlying high dimensional data. The accuracy score may be output in the form of a data set that is used to identify an estimated veracity of data as estimated by the module 1000, which for example, can be used downstream in relation to understanding a confidence associated with a particular identified pattern/trend, the confidence being useful in weighing outcomes or generated expected values. Thus, in the financial institution example, different DR algorithms may be tested to find an optimal DR for the client data.

Figure 11:
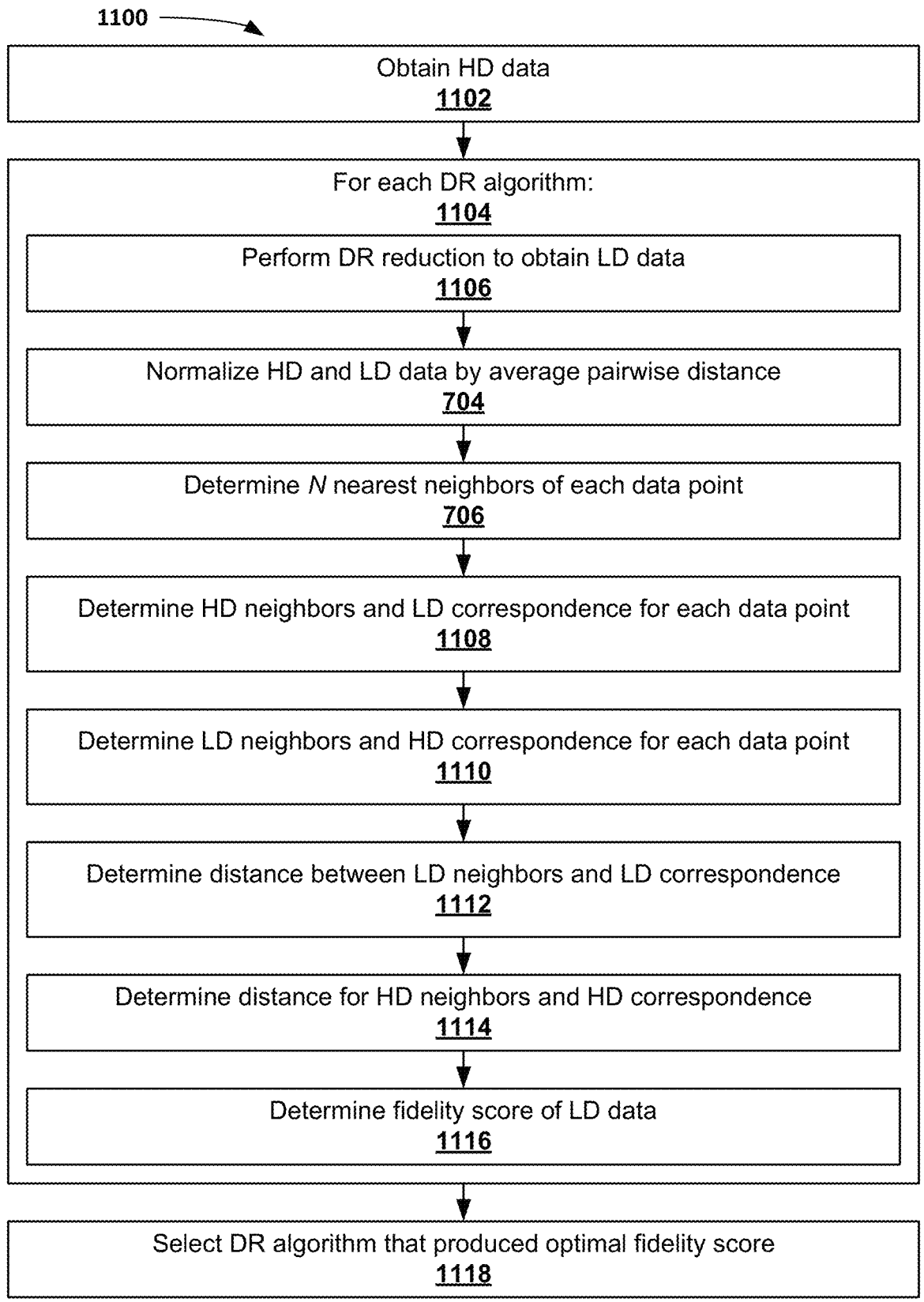
FIG. 11 illustrates, in a flowchart, an example of a method of determining a reliability score indicative of a level of fidelity between high dimensional (HD) data and corresponding dimension-reduced (LD) data, in accordance with some embodiments.

FIG. 11 illustrates, in a flowchart, an example of a method 1100 of determining a reliability score indicative of a level of fidelity between high dimensional (HD) data and corresponding dimension-reduced (LD) data, in accordance with some embodiments. The method 1100 comprises obtaining 1102 the HD data, performing several steps for each DR algorithm available to be tested 1104, and selecting 1118 a DR algorithm that produces an optimal fidelity score to be used.

For each DR algorithm available to be tested 1104, a fidelity score is determined 1116. To do this, each DR reduction algorithm is performed 1106 to obtains separate LD data. The HD and LD data may be normalized 704 by average pairwise distance, respectively. Next, the nearest N neighbors of each data point is determined 706 for the HD and LD data, respectively. Next, for each data point in the nearest neighbors, the HD neighbors and their LD correspondence is determined 1108. The LD correspondence comprises the LD data that is obtained following the DR. Next, for each data point in the nearest neighbors, the LD neighbours and their HD correspondence is determined 1110. The HD correspondence comprises higher dimensional data that is obtained following an inverse DR applied to the LD data. It is noted that steps 1108 and 1110 may be performed in any order or at the same time with appropriate processing capabilities. It is also noted that if the DR algorithm selected has "perfect" fidelity on the HD data, then the HD neighbors and HD correspondence would comprise identical data points (as would the LD neighbors and LD correspondence).

Once the HD neighbors and HD correspondence and LD neighbors and LD correspondence have been determined 1108, 1110 for each data in the nearest neighbors of each data point, then a distance between the LD neighbors and LD correspondence is determined 1112. In some embodiments, this distance may be determined using a Wasserstein discontinuity calculation. Next a distance between the HD neighbors and HD correspondence is determined 1114. In some embodiments, this distance may be determined using a Wasserstein many-to-one calculation. It is noted that if the DR algorithm selected has "perfect" fidelity on the HD data, then the distance between the HD neighbors and HD correspondence would be zero (as would the distance between the LD neighbors and LD correspondence). Once the distances are determined 1112, 1114, then the fidelity score of the DR algorithm with respect to the DR of the HD data into LD data is determined 1116. In some embodiments, the fidelity score is an average discontinuity and many-to-one calculation, as shown in equation (4) above, that provides an average cost.

Some embodiments demonstrate nontrivial bounds on a class of continuous dimensionality reduction mappings. These could be parametric functions, for example neural networks. In some embodiments, the tool is configured to explore their continuity and one-to-one properties both analytically and experimentally. Additionally, the bound described herein is on one fiber, in some embodiments, the tool can be configured to extend the bound to distribution of fibers. Moreover, the bound described herein is for continuous DR maps, extensions to arbitrary DR maps is an important direction.

The results described herein are under the continuous setting, and in some embodiments, similar results are analyzed in the discrete setting, where precision and recall cannot be achieved in an arbitrarily small neighborhood. A discrete analog is, when K points are reduced in an n dimensional simplex to a m dimensional Euclidean space, average precision and recall over the points cannot be perfect at the same time, where m<n and n<<K. The results described herein were based on continuous waist inequality and potential discrete results might be based the combinatorial waist inequality.

The effectiveness of Wasserstein measures by analyzing visualizations is shown in some examples.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the present disclosure, numerous references are made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product or hardware appliance. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

What is claimed is:

1. A system for determining a reliability score indicative of a level of fidelity between high dimensional (HD) data and corresponding dimension-reduced (LD) data, the system comprising:
    a processor; and
    a non-transitory computer-readable medium having stored thereon program instructions executable by the processor, the processor configured to:
        perform a dimensionality reduction on the HD data, the dimensionality reduction resulting in the corresponding LD data;
        normalize the HD data and the corresponding LD data;
        determine a plurality of nearest neighbors of each data point in the HD data;
        determine HD neighbors and correspondence LD neighbors for each data point in the plurality of nearest neighbors of each data point in the HD data;
        perform an inverse dimensionality reduction on the corresponding LD data, the inverse dimensionality reduction resulting in correspondence HD data;
        determine a plurality of nearest neighbors of each data point in the corresponding LD data;
        determine LD neighbors and correspondence HD neighbors for each data point in the plurality of nearest neighbors of each data point in the corresponding LD data;
        determine a distance between the LD neighbors and the correspondence LD neighbors;
        determine a distance between the HD neighbors and the correspondence HD neighbors;
        determine a cost for the dimension reduction based on the distance between the LD neighbors and the correspondence LD neighbors, and between the HD neighbors and the correspondence HD neighbors; and
        determine that the cost is within a fidelity range.

2. The system of claim 1, wherein to normalize the HD data and LD data, the processor is further configured to:
    normalize the HD data by average pairwise distance; and
    normalize the LD data by average pairwise distance.

3. The system of claim 1, wherein the correspondence LD neighbors comprise corresponding neighbors in the dimensionality reduction reduced LD data.

4. The system of claim 1, wherein to determine the distance between the LD neighbors and correspondence LD neighbors, the processor is further configured to:
    determine a Wasserstein discontinuity distance between the LD neighbors and correspondence LD neighbors.

5. The system of claim 1, wherein to determine the distance between the HD neighbors and correspondence HD neighbors, the processor is further configured to:
    determine a Wasserstein many-to-one distance between the LD neighbors and correspondence LD neighbors.

6. The system of claim 1, wherein to determine the cost for the dimension reduction, the processor is further configured to:
    determine an average Wasserstein discontinuity and many-to-one distance.

7. A computer-implemented method of determining a reliability score indicative of a level of fidelity between high dimensional (HD) data and corresponding dimension-reduced (LD) data, the method comprising:
    performing, by a processor, a dimensionality reduction on the HD data, the dimensionality reduction resulting in the corresponding LD data;
    normalizing, by the processor, the HD data and the corresponding LD data;
    determining, by the processor, a plurality of nearest neighbors of each data point in the HD data;
    determining, by the processor, HD neighbors and correspondence LD neighbors for each data point in the plurality of nearest neighbors of each data point in the HD data;
    performing, by the processor, an inverse dimensionality reduction on the corresponding LD data, the inverse dimensionality reduction resulting in correspondence HD data;
    determining, by the processor, a plurality of nearest neighbors of each data point in the corresponding LD data;
    determining, by the processor, LD neighbors and correspondence HD neighbors for each data point in the plurality of nearest neighbors of each data point in the corresponding LD data;
    determining, by the processor, a distance between the LD neighbors and the correspondence LD neighbors;
    determining, by the processor, a distance between the HD neighbors and the correspondence HD neighbors;
    determining, by the processor, a cost for the dimension reduction based on the distance between the LD neighbors and the correspondence LD neighbors, and between the HD neighbors and the correspondence HD neighbors; and
    determining, by the processor, that the cost is within a fidelity range.

8. The method of claim 7, wherein the normalizing of the HD data and LD data comprises:
    normalizing, by the processor, the HD data by average pairwise distance; and
    normalizing, by the processor, the LD data by average pairwise distance.

9. The method of claim 7, wherein the correspondence LD neighbors comprise corresponding neighbors in the dimensionality reduction reduced LD data.

10. The method of claim 7, wherein determining the distance between the LD neighbors and correspondence LD neighbors comprises:
    determining, by the processor, a Wasserstein discontinuity distance between the LD neighbors and correspondence LD neighbors.

11. The method of claim 7, wherein determining the distance between the HD neighbors and correspondence HD neighbors comprises:

determining, by the processor, a Wasserstein many-to-one distance between the LD neighbors and correspondence LD neighbors.

12. The method of claim 7, wherein determining the cost for the dimension reduction comprises:

determining an average Wasserstein discontinuity and many-to-one distance.

13. A non-transitory computer-readable storage medium having instructions thereon which when executed by a processor perform a method of determining a reliability score indicative of a level of fidelity between high dimensional (HD) data and corresponding dimension-reduced (LD) data, the method comprising:

performing, by the processor, a dimensionality reduction on the HD data, the dimensionality reduction resulting in the corresponding LD data;

normalizing, by the processor, the HD data and the corresponding LD data;

determining, by the processor, a plurality of nearest neighbors of each data point in the HD data and LD data, respectively;

determining, by the processor, HD neighbors and correspondence LD neighbors for each data point in the plurality of nearest neighbors of each data point in the HD data;

performing, by the processor, an inverse dimensionality reduction on the corresponding LD data, the inverse dimensionality reduction resulting in correspondence HD data;

determining, by the processor, a plurality of nearest neighbors of each data point in the corresponding LD data;

determining, by the processor, LD neighbors and correspondence HD neighbors for each data point in the plurality of nearest neighbors of each data point in the corresponding LD data;

determining, by the processor, a distance between the LD neighbors and the correspondence LD neighbors;

determining, by the processor, a distance between the HD neighbors and the correspondence HD neighbors;

determining, by the processor, a cost for the dimension reduction based on the distance between the LD neighbors and the correspondence LD neighbors, and between the HD neighbors and the correspondence HD neighbors; and determining, by the processor, that the cost is within a fidelity range.

* * * * *